United States Patent [19]

Harvey et al.

[11] Patent Number: 5,042,040
[45] Date of Patent: Aug. 20, 1991

[54] AMPLITUDE NOISE REDUCTION FOR OPTICALLY PUMPED MODELOCKED LASERS

[75] Inventors: George T. Harvey, Princeton; Michael S. Heutmaker, Trenton; Martin C. Nuss, Fair Haven; Peter R. Smith, Westfield, all of N.J.

[73] Assignee: AT&T Bell Laboratories, Murray Hill, N.J.

[21] Appl. No.: 502,096

[22] Filed: Mar. 30, 1990

[51] Int. Cl.$^5$ .............................................. H01S 3/098
[52] U.S. Cl. ...................................... 372/18; 372/25; 372/72
[58] Field of Search ....................... 372/18, 19, 25, 26, 372/70, 71, 72, 33

[56] References Cited

U.S. PATENT DOCUMENTS

| | | | |
|---|---|---|---|
| 4,019,157 | 4/1977 | Hutchinson et al. | 372/71 |
| 4,143,332 | 3/1979 | Michon et al. | 372/25 |
| 4,227,159 | 10/1980 | Barrett et al. | 372/18 |
| 4,400,814 | 8/1983 | Fork et al. | 372/94 |
| 4,755,016 | 6/1988 | DeLoach, Jr. et al. | 372/18 |
| 4,815,080 | 3/1989 | Chesnoy et al. | 372/18 |
| 4,930,131 | 5/1990 | Sizer II | 372/18 |

OTHER PUBLICATIONS

Chwalek et al., "A Mixer Based Electro-Optic Sampling System for Submillivolt Signal Detection", Review of Scientific Instruments, vol. 61, No. 4, 1990, pp. 1273-1276.

Weingarten et al., "Picosecond Optical Sampling of GaAs Integrated Circuits", IEEE Journal of Quantum Electronics, vol. 24, No. 2, 1988, pp. 198-210.

J. Kluge et al., Optics Communications, vol. 51, No. 4, Sep. 15, 1984, "Fluctuations in Synchronously Mode-Locked . . . ", pp. 271-277.

D. Von der Linde, Appl. Phys. B., vol. 39, 1986, "Characterization of the Noise in Continuously . . . ", pp. 201-217.

U. Keller et al., IEEE J. of Quantum Elec., vol. 25, No. 3, Mar. 1989, "Noise Characterization of Femtosecond Fiber . . . ", pp. 280-288.

Spectra-Physics Product Catalog, Apr. 1987, pp. 2,9, 12-15, back inside cover.

Primary Examiner—Frank Gonzalez
Assistant Examiner—Susan S. Morse
Attorney, Agent, or Firm—Gregory C. Ranieri

[57] ABSTRACT

Amplitude noise is dramatically reduced in an optically pumped modelocked laser arrangement by incorporating an intra-cavity or external cavity mode selection element with a continuous-wave pump laser coupled optically to a modelocked laser. The mode selection element causes a light beam generated from the pump laser to operate nominally at a single frequency, that is, substantially a single longitudinal mode. Mode selection may be realized with an air-spaced or solid material Fabry-Perot etalon.

11 Claims, 2 Drawing Sheets

AMPLITUDE NOISE REDUCTION FOR OPTICALLY PUMPED MODELOCKED LASERS

TECHNICAL FIELD

This invention relates to lasers and, more particularly, to optically pumped modelocked lasers.

BACKGROUND OF THE INVENTION

Continuous-wave (CW) modelocked lasers are important for the generation of ultrashort light pulses. One such laser, a colliding pulse modelocked laser, is a stable source of subpicosecond light pulses. Ultrashort light pulses are used to study ultrafast phenomena with techniques ranging from spectroscopy to electrooptic sampling.

Various types of noise are known to accompany the ultrashort light pulses from CW modelocked lasers. Noise for such lasers has been characterized as amplitude noise and phase noise noise. See U. Keller et al., *IEEE J. of Quant. Elect.*, Vol. 25, No. 3, pp. 280–288 (1989) and D. von der Linde et al., *Appl. Phys. B*, 39, pp. 201–217 (1986). Amplitude noise gives rise to measurement fluctuation within the signal detection bandwidth while limiting one's ability to achieve high sensitivity in the experimental technique. High sensitivity is generally understood to mean a sensitivity limited only by shot noise processes. Phase noise also adds noise to measurements while degrading temporal resolution of the experimental technique.

For optical probing experiments in which an optical probe beam is modulated in proportion to a variable under measurement, it is important to understand the amplitude spectrum of the laser generating the optical probe beam. Understanding of the amplitude spectrum has been limited in the prior art to merely characterizing the spectrum without uncovering any source noise appearing in the spectrum. Techniques have been devised to avoid or ameliorate the effects of noise in the amplitude spectrum. For example, reduction of the detection bandwidth or translation of the detected signal to higher frequencies by chopping techniques.

Amplitude noise causes fluctuations in optical intensity of the probe beam. Intensity fluctuations within the detection bandwidth directly cause corresponding fluctuations of the variable being measured which, in turn, degrade the signal-to-noise ratio of the measurement. By reducing the detection bandwidth, it is possible to reduce the amount of amplitude noise entering the measuring apparatus. Unfortunately, when applied to optical probing experiments, this procedure generally results in unacceptable acquisition times which are susceptible to long term drift of the measured variable.

In order to overcome the latter problem, it has been proposed to translate the detected signal to higher frequencies by chopping techniques because amplitude noise of most lasers decreases with increasing frequency. Residual amplitude noise at the chopping frequency reduces sensitivity by limiting the minimum detectable signal for a given acquisition time. When amplitude noise peaks appear in the power spectrum, standard procedures have evolved to keep the chopping frequency away from the noise peaks. In some lasers such as the colliding pulse modelocked laser, the noise peaks occur at regular intervals rising 40 dB or more above background noise levels and having widths of several hundred kHz.

While the prior art has developed a characterization of amplitude noise, an understanding of its deleterious effects, and several techniques for performing experiments somewhat effectively in the presence of the amplitude noise, there has been no effort to locate a source of the amplitude noise. Moreover, there has been no known technique or apparatus developed for eliminating or even substantially reducing the level of the amplitude noise.

SUMMARY OF THE INVENTION

Amplitude noise is dramatically reduced in an optically pumped modelocked laser arrangement by having an intra-cavity or external cavity mode selection element included within a continuous-wave pump laser which is coupled optically to a modelocked laser. The mode selection element causes a light beam generated from the pump laser operate nominally at a single frequency, that is, in substantially a single longitudinal mode. Mode selection may be realized with an airspaced or solid material Fabry-Perot etalon.

In an exemplary embodiment, the modelocked laser is a standard colliding pulse modelocked laser pumped by an argon laser including an intra-cavity Fabry-Perot etalon for forcing the argon pump laser to generate a pump light beam in a single longitudinal mode.

BRIEF DESCRIPTION OF THE DRAWING

A more complete understanding of the invention may be obtained by reading the following description of a specific illustrative embodiment of the invention in conjunction with the appended drawing in which.

DETAILED DESCRIPTION

Figure 1:
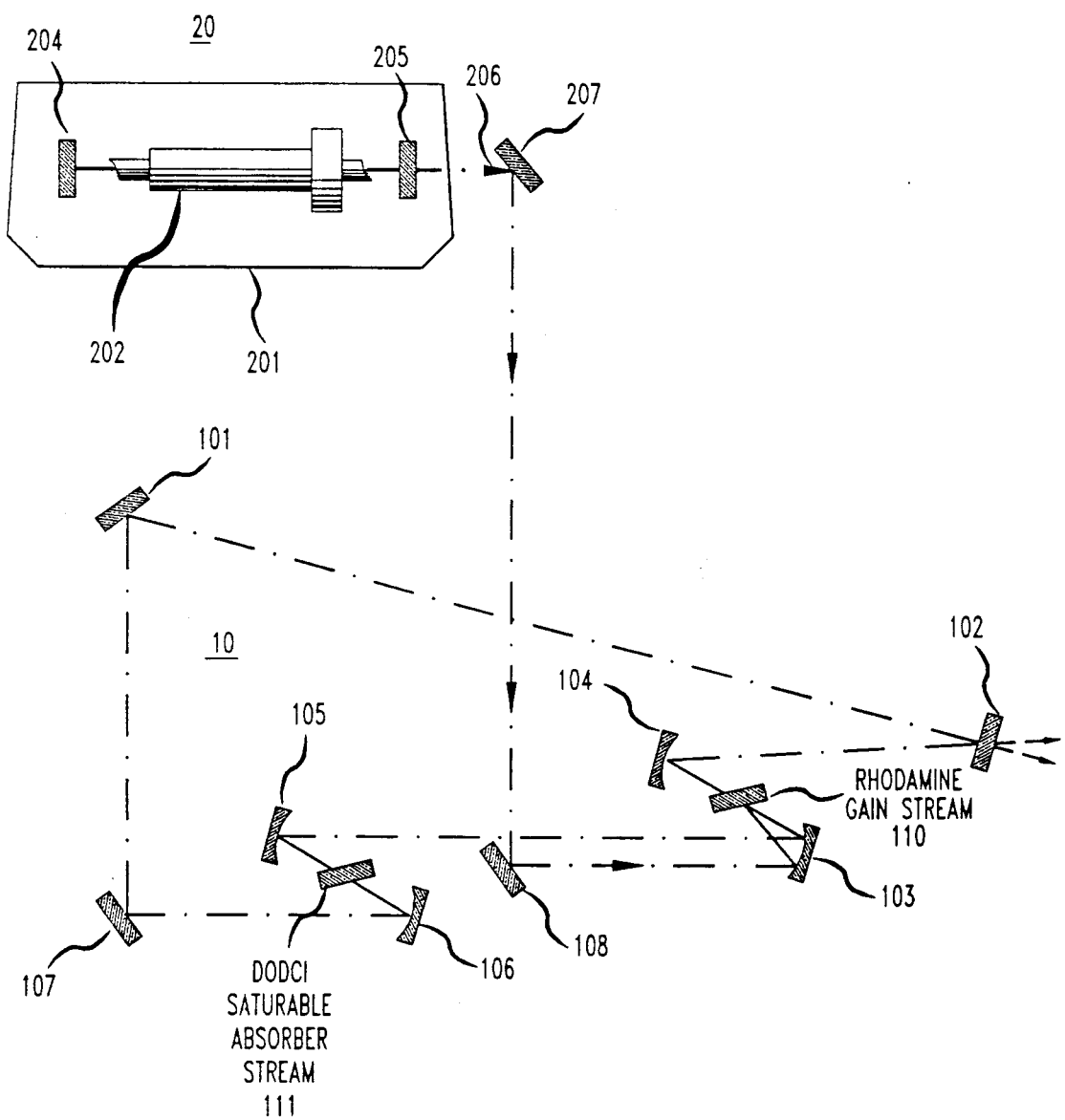
FIG. 1 shows a prior art arrangement for an optically pumped modelocked laser.

As described above, amplitude noise has plagued optically pumped modelocked lasers such as the exemplary embodiment shown in FIG. 1 wherein the pump laser operates in a continuous wave (cw) mode. The particular combination of a cw argon ion laser pumping a colliding pulse modelocked laser exhibits spurious modulation sidebands in the amplitude noise spectrum as shown in curve 32 of FIG. 3. It has been determined by us that the lightbeam output by the pump laser contains a small amount of spurious modulation at harmonics of the pump laser cavity round-trip frequency caused by longitudinal mode beating. By mixing the spurious modulation from the pump laser with the lightbeam pulses output by the modelocked laser, a set of discrete noisy spurious modulation sidebands is produced in the lightbeam output by the modelocked laser. It is now known by us that the set of discrete noisy spurious modulation sidebands in the modelocked laser output lightbeam can be eliminated or, at least, significantly reduced by causing the cw pump laser to operate in a single longitudinal mode.

An exemplary prior art embodiment of an optically pumped modelocked laser arrangements is depicted in FIG. 1. This arrangement includes a cw pump laser 20 optically coupled to modelocked laser 10. The exemplary cw pump laser is shown as an argon ion laser and the exemplary modelocked laser is shown as a colliding pulse modelocked laser. Both exemplary lasers are well known in the art and are described below merely for purposes of explication.

Typically, the pump laser is operated in continous wave, broadband operation. That is, the pump laser operates at a number of wavelengths simultaneously. The pump laser includes an enclosure 201 comprising a transparent material at the wavelengths of interest at least on each of the end surfaces. Also included in cw pump laser 10 are plasma tube 202 containing argon ions, for example, and reflective surfaces 204 and 205. Other exemplary ions of interest include Kr and Nd:YAG. Reflective surfaces 204 and 205 are spaced apart by a fixed distance to form a resonant cavity therebetween and permit coherent stimulated emission from the excited ions in the plasma tube to generate an output light beam 206 centered about a nominal pump wavelength. Reflective surfaces 204 and 205 may be highly reflective mirrors or the like. As shown in FIG. 1, it may be necessary to couple light beam 206 from the pump laser into the modelocked laser through a mirror 207.

Modelocked laser 20 includes a wide variety of known modelocked lasers such a color center lasers, colliding pulse modelocked lasers, and the like. Modelocking techniques include passive modelocking, active modelocking, additive pulse modelocking and the like.

Typically, if a laser operates on several longitudinal or transverse cavity modes at once the phase relationship between different modes is random. Modelocking of a laser consists of providing a mechanism to establish a definite phase relationship among modes. The discussion here is limited to locking of longitudinal modes. in such a process the temporal output of the laser becomes modulated by the coherent interaction among the modes, at the mode separation frequency, $\nu$, which is the inverse of the cavity round-trip time. When a large number, n, of modes is locked the output is in the form of a train of short pulses, each of a width of roughly the round-trip time divided by n. The gain bandwidth of the laser limits n and the shortest pulses are clearly created in large-bandwidth systems. The pulse width can be increased by inserting etalons in the laser cavity to reduce the bandwidth. It is interesting to note that the mode-locking process may not simply establish a phase coherence among the modes that oscillate in the free-running laser. Rather, because of the coherent interaction between the modes and the locking mechanism, a much greater number of longitudinal modes may be present in the modelocked laser. Modelocking of paramagnetic-ion lasers has been observed in cw-pumped systems operating both cw and repetitively Q-switched. CW-pumped lasers have employed passive modelocking techniques, usually saturable absorbers such as dyes in solutions or additive pulse modelocking, which force the laser modes to phase-lock in order to generate the short pulses needed to overcome the absorber loss. Active modelocking, the insertion of an intracavity element which modulates either the amplitude or the phase of the laser cavity field at frequency $\nu$, has been used for both pulsed and cw pumping. Pulse-widths achieved by common paramagnetic ion lasers are shorter than those observed from gas lasers but longer than the 1 to 10 psec pulses from modelocked dye, color-center or semiconductor lasers.

Exemplary modelocked laser 10 is shown in FIG. 1 as a colliding pulse modelocked laser. Descriptions of such a modelocked laser are given in U.S. Pat. No. 4,400,814 which is expressly incorporated herein by reference.

As indicated in FIG. 1, mirrors 101 through 107 are arranged to form a ring laser cavity. Mirrors 101 and 107 are 100 percent reflective whereas mirror 102 is partially transmissive thereby permitting pulses that are generated the ring laser cavity to be coupled out of the cavity. The curvature of mirrors 103 through 106 is selected such that the laser operates in the lowest transverse mode. In addition, the mirrors 103 and 104 (10 cm radius of curvature) are positioned so as to focus the generated light pulses into a gain medium stream 110 consisting of Rhodamine 6G in ethylene glycol at a concentration which absorbs approximately 90 percent of the pump light at 5145 Å. Mirrors 105 and 106 (5 cm radius of curvature) are positioned so as to focus the generated light pulses into a saturable absorber stream 111 consisting of DODCI (diethyloxadicarbocyanine iodide) dissolved in ethylene glycol with a measured small signal loss of approximately 20 percent at the absorption peak (580 mm). The curvature of mirrors 103 through 106 is also selected so as to achieve the stability conditions that involve the beam cross sections in the amplifying and absorbing regions ($A_a$ and $A_b$, respectively) and the amplifier and absorber molecular cross sections ($\sigma_a$ and $\sigma_b$, respectively). These parameters are usually related by the Equation $s=k(A_a\sigma_b/A_b\sigma_a)$. In the present embodiment, k equals two because the saturation occurs by way of standing waves, and the curvature of the mirrors must be selected such that the beam cross sections $A_a$ and $A_b$ result in a parameter s that is much greater than one.

It is desirable to avoid placing the gain stream so that one pulse passes through it with a time delay after the preceding pulse which is short compared to the recovery time of the gain medium. The short delay condition tends to cause one pulse to be larger in magnitude than the other and this in turn degrades the contrast in the interference pattern. The one exception to this rule occurs when the gain stream is exactly opposite the absorber stream. Then the two pulses pass through the gain stream at precisely the same time so as to form an interference pattern in the gain stream similar to that formed in the absorber. This condition may produce some additional pulse shortening.

The nozzle that is used to create the gain medium stream 110 is a conventional commercial stainless steel nozzle having an interior thickness of 15 mils, whereas the nozzle that is used to create the saturable absorber stream 111 is specially constructed in a manner to be described hereinafter so as to create an absorber stream having a thickness of about 10 microns. The gain stream 110 is pumped by a continuous argon laser 20 whose output lightbeam 206 is coupled by way of a mirror 103. This pump beam from laser 20 is reflected by mirror 103 so as to cause the beam to impinge of the gain medium stream 110.

Figure 3:
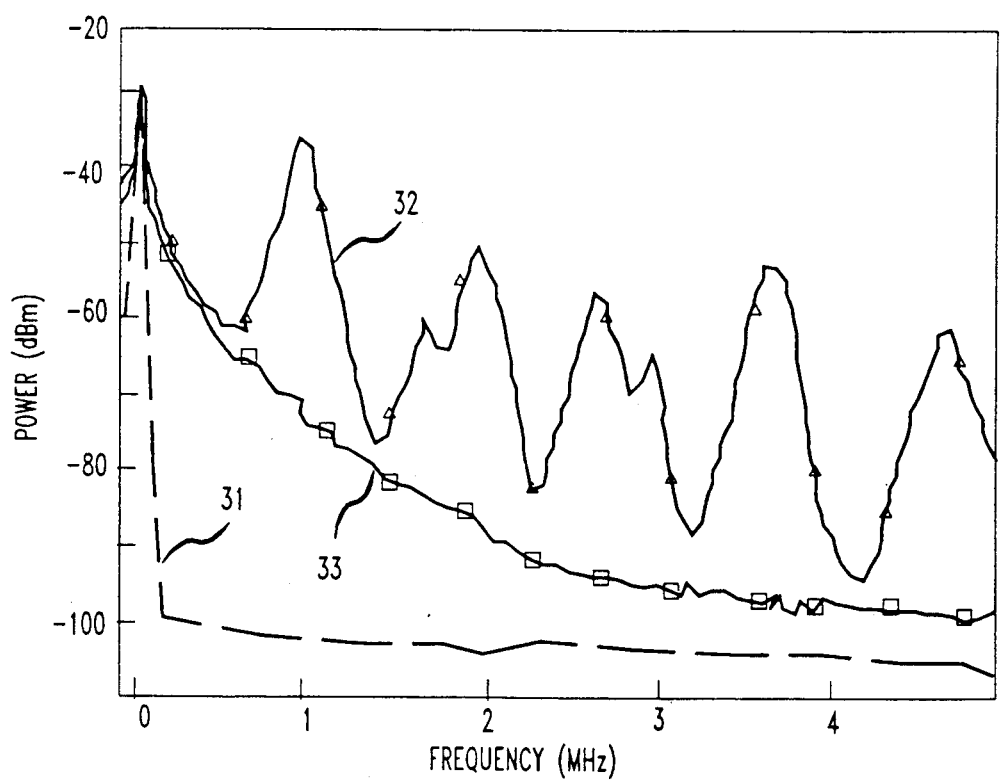
FIG. 3 shows exemplary noise spectra for the arrangements from FIGS. 1 and 2.

For the optically pumped modelocked laser arrangement shown in FIG. 1 wherein a cw argon ion pump laser is coupled to a colliding pulse modelocked laser, the amplitude noise spectrum is shown as curve 32 in FIG. 3. Sidebands and subsidiary peaks in this curve arise from nonlinear coupling of harmonics of the longitudinal mode beating frequency of the pump and modelocked laser cavities. In order to generate the amplitude noise spectrum, shown in FIG. 3, a colliding pulse modelocked laser was pumped by $\simeq 3$ watts of the 514 nm spectral line of an argon ion laser (Coherent Model I-200). The colliding pulse modelocked laser cavity length was originally set to approximately 100 MHz pulse repetition frequency. Output power of the colliding pulse modelocked laser is approximately 25 to 30 mW into each of the two output beams of the ring laser cavity with pulses in the output lightbeam having a duration of typically 100 fs at a wavelength of 625 nm. For the frequency span shown in FIG. 3, this optically pumped modelocked laser arrangement has spurious sidebands with amplitude noise which rise roughly 40 to 50 dB above the background noise with a bandwidth of several hundred kHz. Curve 31 in FIG. 3 establishes the level of system noise for the measuring system when the output lightbeam from the colliding pulse modelocked laser is blocked.

Figure 2:
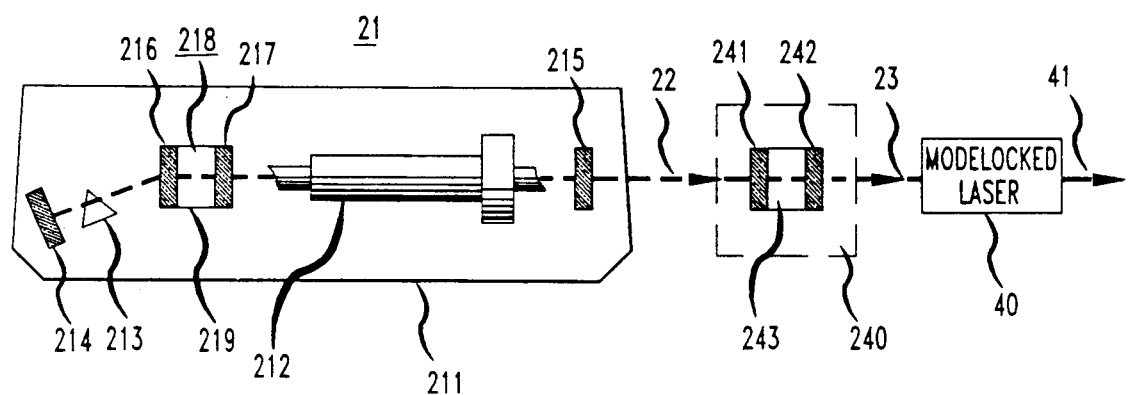
FIG. 2 shows a simplified diagram of an optically pumped modelocked laser arrangement in accordance with the principles of the invention.

Elimination of the spurious sidebands and, thereby, dramatic reduction of the amplitude noise is achieved in accordance with the principles of the invention by placing a mode selection element in combination with the pump laser to force the pump laser into single longitudinal mode operation. Intracavity and external cavity Fabry-Perot etalons are contemplated for use as the mode selection element. These etalons comprise spaced apart reflective surfaces forming the etalon with air or a solid material such as fused silica in the space between the reflective surfaces of the etalon. An exemplary arrangement realized in accordance with the principles of the invention is shown in FIG. 2. Proof that this arrangement indeed eliminates the spurious amplitude noise sidebands is shown by curve 33 in FIG. 3. Curve 33 depicts the amplitude noise spectrum for the arrangement in FIG. 2.

Pump laser 21 includes either intracavity Fabry-Perot etalon 219 or external cavity Fabry-Perot etalon 240 to force pump lightbeam 23 to be substantially single longitudinal mode. Intracavity Fabry-Perot etalon 219 comprises spaced apart reflective surfaces 216 and 217 and cavity material 218. Dielectric coatings or other techniques well known in the art are contemplated for use as the etalon reflective surfaces. Air or solid materials such as fused silica are contemplated for use in cavity material 218. While it is desirable to use an intracavity etalon such as Fabry-Perot etalon 219, it is possible to employ an external etalon which is optically coupled to the output facet of the cw laser. One such external etalon is shown as Fabry-Perot etalon 240 which comprises spaced apart reflective surfaces 241 and 242 and cavity material 243. Dielectric coatings or other techniques well known in the art are contemplated for use as the etalon reflective surfaces. Air or solid materials such as fused silica are contemplated for use in cavity material 243.

Pump laser 21 further includes enclosure 211, reflective surfaces 214 and 215, and plasma tube 212. These components are similar to those previously described for pump laser 20. Reflective surfaces 214 and 215 are in spaced apart relationship to form an optically resonant cavity therebetween.

Prism 213 is an exemplary intracavity dispersive element for pump laser 21. It is a Brewster angle prism whose dispersive effect is utilized to allow only one spectral line to lase. Different spectral lines of the laser may be accessed by tilting the prism assembly including reflective surface 214 with respect to the longitudinal axis of pump laser 21. Even though the prism permits the laser to operate in a single spectral line, the output of such a laser without intracavity etalon 29 would indicate that many distinct frequencies are present under the gain profile of the spectral line. By introducing intracavity etalon 219, it is possible to achieve single longitudinal mode operation. When combined with the prism arrangement, the intracavity etalon provides both single longitudinal mode and single spectral line operation.

Other exemplary intracavity dispersive elements include diffraction gratings and the like. Diffraction gratings are realizable with either high or low resolution. Low resolution gratings have a low dispersion comparable to that of the Brewster angle prism. As such, low resolution gratings are suitable for selecting a single spectral line. In contrast, high resolution gratings are very highly dispersive and provide the added benefit of simultaneous mode and spectral line selectivity. Accordingly, high resolution gratings may be substituted for the intracavity etalon as well as for the intracavity dispersive element. It is understood that certain lasers employed as pump lasers operate on a single spectral line so that it may not be necessary to have an intracavity dispersive element for ensuring selectivity of a single spectral line. One such laser is a Nd:YAG laser.

The etalon is essentially a bandpass filter which introduces sufficient loss on all intracavity longitudinal modes except the one selected by the etalon. This mode will be the only one lasting at any time. The optical path length of the Fabry-Perot etalon determines which mode is selected. Optical path length depends on the actual separation between the reflective surfaces and the refractive index of the material in the cavity of the etalon. Standard techniques are well known for setting up the etalon to extract a desired mode. For example, a solid fuse silica intracavity etalon has a length of approximately 1 cm for extracting desired longitudinal modes in argon ion lasers. It is possible to tune the intracavity etalon to other longitudinal modes by tilting the etalon with respect to the longitudinal axis of laser 21 or by temperature tuning or current tuning the refractive index of the cavity material for the etalon.

When an intracavity Fabry-Perot etalon is employed in the pump laser 21, lightbeams 22 and 23 are identical because optional external etalon 240 is not used. Pump lightbeam 23 is coupled into modelocked laser 40 for optically pumping the laser. An output lightbeam 41 is shown for modelocked laser 40.

It is contemplated that any laser having a cw mode of operation and the appropriate wavelength or wavelength range for pumping the modelocked laser may be employed as pump laser 21. Similarly, any laser capable of modelocked operation by any means such as active modelocking, passive modelocking, additive pulse modelocking or the like, may be employed as modelocked laser 40. For generating curve 33, intracavity etalon 219 was used with a cw argon ion pump laser coupled to a colliding pulse modelocked laser.

Other embodiments contemplate the use of an etalon with a krypton ion pump laser coupled to a colliding pulse modelocked laser and with a Nd:YAG pump laser coupled to a color-center modelocker laser.

We claim:

1. Optical apparatus comprising a continuous-wave pump laser for generating a first light beam, a modelocked laser for generating a second light beam in response to said first light beam, said pump laser including first and second reflective surfaces spaced apart from each other to form an optically resonant cavity therebetween for supporting a plurality of longitudinal modes and means optically coupled to said optically resonant cavity for selecting substantially a single longitudinal mode from said plurality of modes so that only said first light beam is substantially limited to operate at a single frequency.

2. The optical apparatus as defined in claim 1 wherein said selecting means includes a Fabry-Perot etalon disposed within said optically resonant cavity, said etalon having third and fourth reflective surfaces spaced apart by a predetermined distance sufficient to cause said substantially single longitudinal mode selection.

3. The optical apparatus as defined in claim 2 wherein said etalon includes air between said third and fourth reflective surfaces.

4. The optical apparatus as defined in claim 2 wherein said etalon includes a solid material between said third and fourth reflective surfaces.

5. The optical apparatus as defined in claim 4 wherein said solid material is fused silica.

6. The optical apparatus as defined in claim 1 wherein said selecting means includes a Fabry- Perot etalon disposed outside said optically resonant cavity, said etalon having third and fourth reflective surfaces spaced apart by a predetermined distance sufficient to cause said substantially single longitudinal mode selection, said third reflective surface optically-coupled to said optically resonant cavity, and said first light beam being emitted through said fourth reflective surface.

7. The optical apparatus as defined in claim 6 wherein said etalon includes air between said third and fourth reflective surfaces.

8. The optical apparatus as defined in claim 6 wherein said etalon includes a solid material between said third and fourth reflective surfaces.

9. The optical apparatus as defined in claim 8 wherein said solid material is fused silica.

10. The optical apparatus as defined in claim 3 wherein said modelocked laser is a colliding pulse modelocked laser.

11. The optical apparatus as defined in claim 4 wherein said modelocked laser is a colliding pulse modelocked laser.

* * * * *